United States Patent
Yamamoto

(10) Patent No.: US 12,126,053 B2
(45) Date of Patent: Oct. 22, 2024

(54) BATTERY

(71) Applicant: TOYOTA JIDOSHA KABUSHIKI KAISHA, Toyota (JP)

(72) Inventor: Satomi Yamamoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 17/475,556

(22) Filed: Sep. 15, 2021

(65) Prior Publication Data

US 2022/0102819 A1    Mar. 31, 2022

(30) Foreign Application Priority Data

Sep. 30, 2020   (JP) .................................. 2020-166063

(51) Int. Cl.
*H01M 50/553*  (2021.01)
*H01M 10/0585* (2010.01)
(Continued)

(52) U.S. Cl.
CPC ..... *H01M 50/553* (2021.01); *H01M 10/0585* (2013.01); *H01M 50/531* (2021.01); *H01M 50/54* (2021.01); *H01M 10/0525* (2013.01)

(58) Field of Classification Search
CPC ........... H01M 50/553; H01M 10/0585; H01M 50/531; H01M 50/54; H01M 10/0525;
(Continued)

(56) References Cited

U.S. PATENT DOCUMENTS 8,673,476 B2    3/2014  Ryu et al.
9,099,755 B2 *  8/2015  Oh ..................... H01M 50/533
(Continued)

FOREIGN PATENT DOCUMENTS

CN    107431177 A    12/2017
JP    2006-196428 A   7/2006
(Continued)

OTHER PUBLICATIONS

Machine translation of KR-20170044990-A. Obtained from PE2E. (Year: 2017).*
(Continued)

*Primary Examiner* — Michael L Dignan
(74) *Attorney, Agent, or Firm* — Oliff PLC

(57) ABSTRACT

A main object of the present disclosure is to provide a battery capable of suppressing the temperature increase of an electrode terminal even when the battery is, for example, fast-charged. The present disclosure achieves the object by providing a battery comprising an electrode body, and an exterior body including an inner region configured to house the electrode body, and the battery includes an electrode terminal placed so as to extend from the inner region to an outer region of the exterior body, the electrode terminal includes an inner current collecting portion placed in the inner region and connected to an electrode tab of the electrode body, and an outer current collecting portion placed in the outer region, and a width of the inner current collecting portion is larger than a width of the outer current collecting portion.

7 Claims, 5 Drawing Sheets

(51) Int. Cl.
*H01M 50/531* (2021.01)
*H01M 50/54* (2021.01)
*H01M 10/0525* (2010.01)

(58) Field of Classification Search
CPC .. H01M 10/0569; H01M 4/133; H01M 4/134; H01M 4/621; H01M 10/052; H01M 10/0567; H01M 50/103; H01M 2300/0037; H01M 2300/004; H01M 4/483; H01M 4/587; H01M 4/622; H01M 4/0404; H01M 4/366
See application file for complete search history.

(56) References Cited

U.S. PATENT DOCUMENTS

| | | | | |
|---|---|---|---|---|
| 9,972,821 | B2* | 5/2018 | Minagata | H01M 50/528 |
| 2006/0269831 | A1* | 11/2006 | Kim | H01M 10/0436 |
| | | | | 29/623.2 |
| 2008/0070102 | A1* | 3/2008 | Watanabe | H01M 10/4207 |
| | | | | 429/91 |
| 2011/0293994 | A1* | 12/2011 | Casoli | H01M 50/54 |
| | | | | 429/158 |
| 2016/0344028 | A1* | 11/2016 | Nakagawa | H01M 4/366 |
| 2017/0025646 | A1* | 1/2017 | Ota | H01M 10/0413 |
| 2017/0110712 | A1* | 4/2017 | Ahn | H01M 50/136 |
| 2017/0110763 | A1* | 4/2017 | Ro | H01M 50/178 |
| 2018/0062148 | A1 | 3/2018 | Cho et al. | |
| 2018/0090737 | A1* | 3/2018 | Sawanishi | H01M 50/211 |
| 2018/0102521 | A1 | 4/2018 | Cho et al. | |
| 2018/0254468 | A1 | 9/2018 | Kim et al. | |
| 2019/0280277 | A1 | 9/2019 | Kato | |
| 2022/0102760 | A1* | 3/2022 | Fukui | H01M 50/178 |

FOREIGN PATENT DOCUMENTS

| | | | | |
|---|---|---|---|---|
| JP | 2009-110813 | A | 5/2009 | |
| JP | 5550805 | B2 | 7/2014 | |
| JP | 2015076178 | * | 4/2015 | H01M 4/13 |
| JP | 2016-105348 | A | 6/2016 | |
| JP | 2018-506159 | A | 3/2018 | |
| JP | 2018-511155 | A | 4/2018 | |
| JP | 2018-530135 | A | 10/2018 | |
| JP | 2019-153555 | A | 9/2019 | |
| JP | 2020-113434 | A | 7/2020 | |
| KR | 101578794 | B1 * | 12/2015 | H01M 50/531 |
| KR | 20170044990 | A * | 4/2017 | H01M 50/557 |
| KR | 2017-0134453 | A | 12/2017 | |
| WO | 2016/157370 | A1 | 10/2016 | |

OTHER PUBLICATIONS

Machine translation of KR-101578794-B1, obtained from PE2E. (Year: 2015).*

Machine English translation of JP 2015-076178 (Year: 2015).*

* cited by examiner

BATTERY

TECHNICAL FIELD

The present disclosure relates to a battery.

BACKGROUND ART

A battery including an electrode body (a laminate of a cathode layer, a separator layer, and an anode layer), and further including an electrode terminal connected to an electrode tab of the electrode body, has been known. For example, Patent Literature 1 discloses an electrode assembly wherein an electrode tab and an electrode lead (electrode terminal) are electrically connected, and the electrode lead, joined to the electrode tab, has rounded end.

CITATION LIST

Patent Literature

Patent Literature 1: Japanese Patent No. 5550805

SUMMARY OF DISCLOSURE

Technical Problem

When a battery is fast-charged, for example, the current is concentrated to the electrode terminal so that the temperature of the electrode terminal is increased in some cases.

The present disclosure has been made in view of the above circumstances, and a main object thereof is to provide a battery capable of suppressing the temperature increase of an electrode terminal even when the battery is, for example, fast-charged.

Solution to Problem

The present disclosure provides a battery comprising an electrode body, and an exterior body including an inner region configured to house the electrode body, and the battery includes an electrode terminal placed so as to extend from the inner region to an outer region of the exterior body, the electrode terminal includes an inner current collecting portion placed in the inner region and connected to an electrode tab of the electrode body, and an outer current collecting portion placed in the outer region, and a width of the inner current collecting portion is larger than a width of the outer current collecting portion.

According to the present disclosure, since the width of the inner current collecting portion is larger than the width of the outer current collecting portion, the current may be suppressed from being concentrated to the electrode terminal so that the temperature increase of the electrode terminal may be suppressed even when the battery is, for example, fast-charged.

In the disclosure, a width of the electrode tab connected to the inner current collecting portion may be larger than a width of the outer current collecting portion.

In the disclosure, the electrode terminal may be placed between the inner current collecting portion and the outer current collecting portion, and may include an intermediate portion placed in a sealing region of the exterior body.

In the disclosure, a plan-view shape of the electrode terminal may be an L-shape.

In the disclosure, the battery may include at least a first electrode body and a second electrode body as a plurality of the electrode bodies, the first electrode body may include an electrode tab P, the second electrode body may include an electrode tab R having an opposite polarity to the electrode tab P, the electrode tab P and the electrode tab R may be connected in the inner region.

In the disclosure, the first electrode body and the second electrode body may be stacked along a thickness direction via an insulating member, and the first electrode body and the second electrode body may respectively include: an anode current collector, a first anode layer, a first separator layer, a first cathode layer, and a first cathode current collector, placed in this order from one surface of the anode current collector, and a second anode layer, a second separator layer, a second cathode layer, and a second cathode current collector, placed in this order from another surface of the anode current collector.

Advantageous Effects of Disclosure

The battery in the present disclosure exhibits an effect that the temperature increase of the electrode terminal may be suppressed even when the battery is, for example, fast-charged.

DESCRIPTION OF EMBODIMENTS

Figure 1:
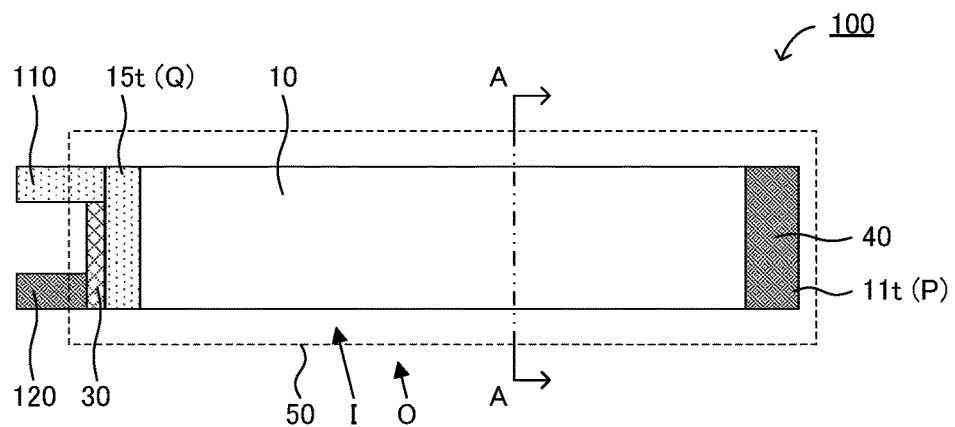
FIG. 1 is a schematic plan view illustrating an example of a battery in the present disclosure.

A battery in the present disclosure will be hereinafter described in detail referring to the drawings. Each figure shown below is schematically expressed, and the size and the shape of each member are appropriately exaggerated, to facilitate understanding. Also, in each figure, the hatching indicating the cross-section of a member is appropriately omitted. Also, in the present specification, in expressing an embodiment of arranging a member on another member, when merely expressed as "on" or "under", it includes both the case of arranging a member directly on or directly under another member so as to be in contact with another member, and the case of arranging a member above or below another member via still another member, unless otherwise specified.

Figure 2A:
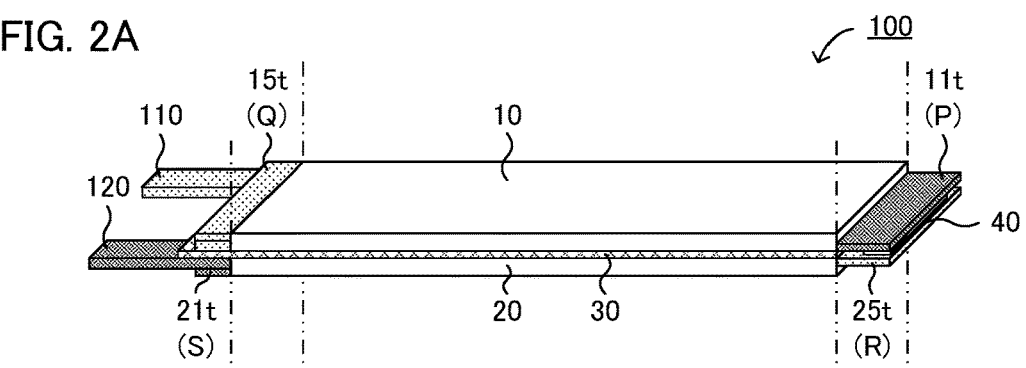
FIGS. 2A and 2B are schematic perspective views illustrating an example of a battery and structural members thereof in the present disclosure.
Figure 2B:
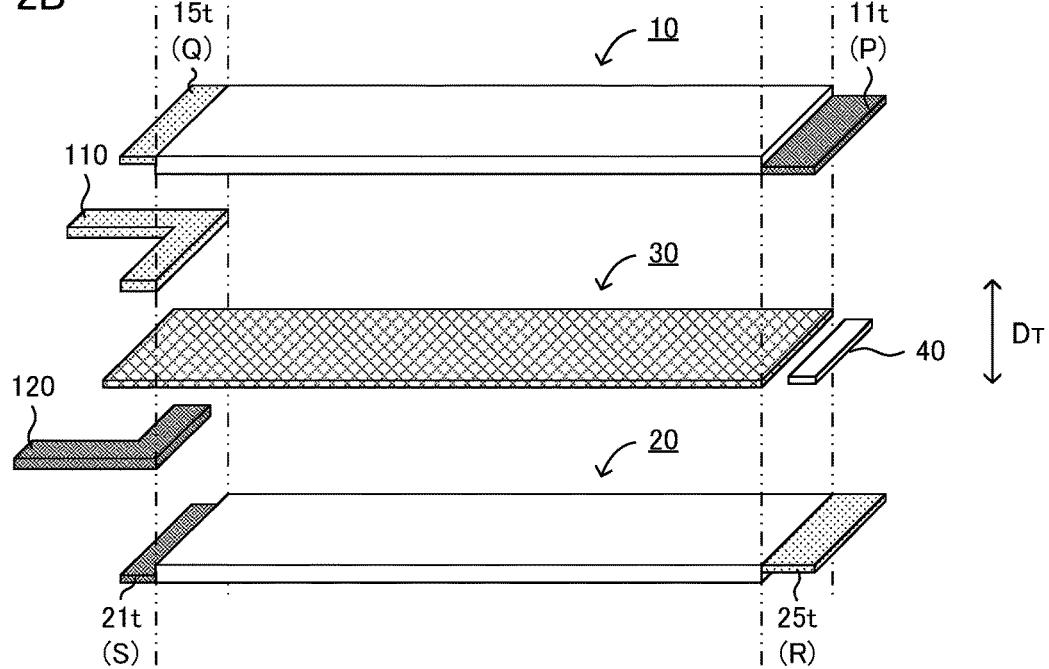

FIG. 1 is a schematic plan view illustrating an example of a battery in the present disclosure. FIGS. 2A and 2B are schematic perspective views illustrating an example of a battery and structural members thereof in the present disclosure. Specifically, FIG. 2A is a schematic perspective view of the battery shown in FIG. 1, and FIG. 2B is a schematic perspective view illustrating the structural members of the battery shown in FIG. 2A.

As shown in FIG. 1 and FIGS. 2A and 2B, battery 100 comprises a plurality of electrode bodies (first electrode body 10 and second electrode body 20), and exterior body 50 including inner region I configured to house these. First electrode body 10 includes anode tab 11t (electrode tab P), and cathode tab 15t (electrode tab Q). Meanwhile, second electrode body 20 includes cathode tab 25t (electrode tab R), and anode tab 21t (electrode tab S). Electrode tab P and electrode tab R are connected in inner region I by connecting member 40. Also, as shown in FIG. 1 and FIGS. 2A and 2B, one end of cathode terminal 110 is connected to cathode tab 15t (electrode tab Q) in inner region I, and another end of cathode terminal 110 is placed in outer region O. Similarly, one end of anode terminal 120 is connected to anode tab 21t (electrode tab S) in inner region I, and another end of anode terminal 120 is placed in outer region O. As described above, cathode terminal 110 and anode terminal 120 are respectively placed so as to extend from inner region I to outer region O of exterior body 50.

Figure 3A:
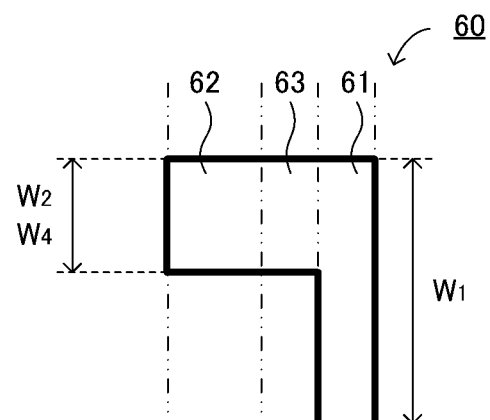
FIGS. 3A to 3C are schematic plan views and a schematic cross-sectional view illustrating an example of an electrode terminal in the present disclosure.
Figure 3B:
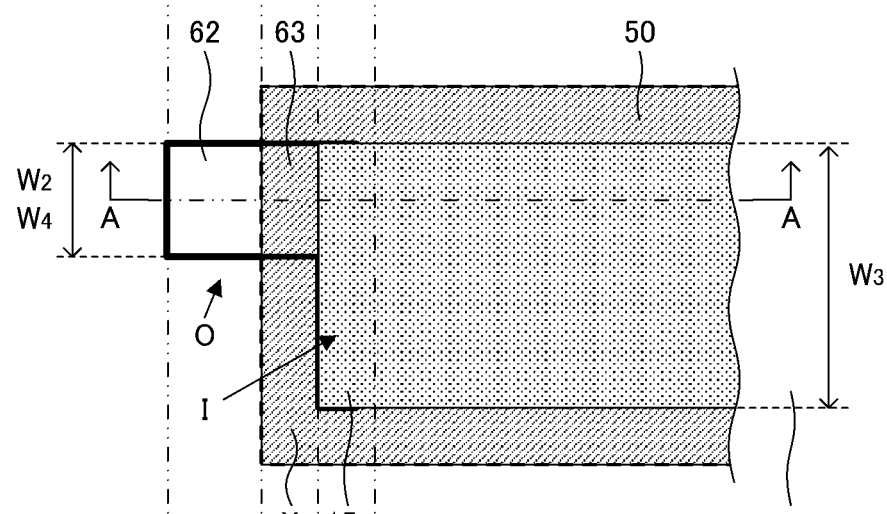
Figure 3C:
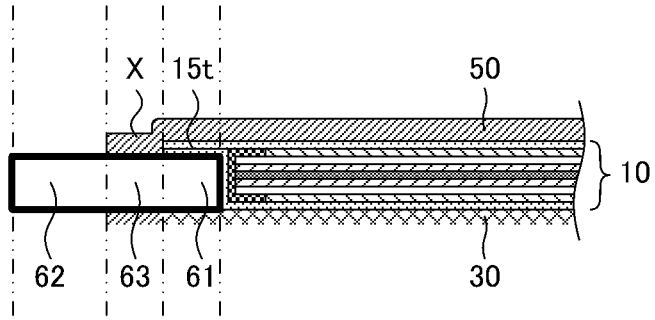

FIGS. 3A to 3C are schematic plan views and a schematic cross-sectional view illustrating an example of an electrode terminal in the present disclosure. FIG. 3A is a schematic plan view illustrating an example of an electrode terminal alone. FIG. 3B is a schematic plan view of a battery including an electrode terminal, and FIG. 3C is an A-A cross-section of FIG. 3B. Electrode terminal 60 shown in FIGS. 3A to 3C includes inner current collecting portion 61, outer current collecting portion 62, and intermediate portion 63. In the present disclosure, width $W_1$ of inner current collecting portion 61 is larger than width $W_2$ of outer current collecting portion 62.

According to the present disclosure, since the width of the inner current collecting portion is larger than the width of the outer current collecting portion, the current may be suppressed from being concentrated to the electrode terminal so that the temperature increase of the electrode terminal may be suppressed even when the battery is, for example, fast-charged. Also, as shown in FIGS. 3A to 3C, for example, when electrode terminal 60 includes intermediate portion 63, if the temperature of intermediate portion 63 increases, the resin in the sealing region is melted so that the sealing property tends to be decreased. In contrast to this, in the present disclosure, since the temperature increase of the electrode terminal may be suppressed, the decrease of the sealing property may be suppressed.

1. Structure of Battery

As shown in FIG. 1, battery in the present disclosure includes electrode terminal (cathode terminal 110, anode terminal 120) placed so as to extend from inner region I to outer region O of exterior body 50. Also, as shown in FIGS. 3A to 3C, electrode terminal 60 includes at least inner current collecting portion 61 placed in inner region I of exterior body 50 and connected to electrode tab (cathode tab 15t) of the electrode body, and outer current collecting portion 62 placed in outer region O of exterior body 50. Incidentally, electrode terminal 60 shown in FIGS. 3A to 3C is a cathode terminal. Here, as shown in FIG. 3A, the width of inner current collecting portion 61 is regarded as $W_1$, and the width of outer current collecting portion 62 is regarded as $W_2$. In the present disclosure, by setting $W_1 > W_2$, the current may be suppressed from being concentrated to the electrode terminal so that the temperature increase of the electrode terminal may be suppressed even when the battery is, for example, fast-charged.

The value of $W_1/W_2$ is not particularly limited, and is, for example, 1.2 or more, may be 1.5 or more, may be 2.0 or more, and may be 2.5 or more. When the value of $W_1/W_2$ is too low, the current may not be sufficiently suppressed from being concentrated. Meanwhile, the value of $W_1/W_2$ is not particularly limited, and is, for example, 5.0 or less. When the value of $W_1/W_2$ is too high, $W_2$ is decreased relatively so that there is a possibility of occurrence of an excessive current concentration in the outer current collecting portion. Also, the temperature change during charge was evaluated by a simulation. Specifically, the temperature change during charge of a case wherein the cathode terminal and the anode terminal are of the same shape and $W_1$ and $W_2$ are respectively 25 mm ($W_1/W_2=1$), was evaluated by a simulation, and the difference between the maximum temperature of the electrode terminal and the minimum temperature of the electrode body was 62° C. In contrast to this, the temperature change during charge of a case wherein the cathode terminal and the anode terminal are of the same shape, $W_1$ was 69 mm, and $W_2$ was 25 mm respectively ($W_1/W_2=2.7$), was evaluated by a simulation, and the difference between the maximum temperature of the electrode terminal and the minimum temperature of the electrode body was 17° C. As described above, with the electrode terminal in the present disclosure, the concentration of the current may be suppressed so that the temperature increase may be suppressed.

Also, as shown in FIG. 3B, the width of the electrode tab (cathode tab 15t) connected to inner current collecting portion 61 is regarded as $W_3$. In the present disclosure, width $W_3$ of the electrode tab is preferably larger than width $W_2$ of outer current collecting portion 62. The reason therefor is to enlarge the contacting area between inner current collecting portion 61 and the electrode tab (cathode tab 15t) so as to further prevent the retention of heat. As the result, the temperature unevenness in a battery is less likely to occur so that the durability of the battery may be improved. Width $W_3$ of the electrode tab may be larger than, equal to, and less than width $W_1$ of the inner current collecting portion. The value of $W_1/W_3$ is not particularly limited, and is, for example, 0.7 or more and 5 or less, and may be 0.7 or more and 2 or less.

Also, as shown in FIGS. 3A to 3C, electrode terminal 60 may include intermediate portion 63 which is placed between inner current collecting portion 61 and outer current collecting portion 62, and is placed in sealing region X of exterior body 50. The both surfaces of intermediate portion 63 are respectively fused to exterior body 50. Incidentally, a terminal film may be placed between intermediate portion 63 and exterior body 50. Width $W_4$ (not shown in the figure) of intermediate portion 63 is not particularly limited, and is preferably smaller than width $W_1$ of inner current collecting portion 61. Preferable range of the value of $W_1/W_4$ is similar to that of the value $W_1/W_2$. Also, width $W_4$ of intermediate portion 63 may be equal to width $W_2$ of outer current collecting portion 62.

Figure 4:
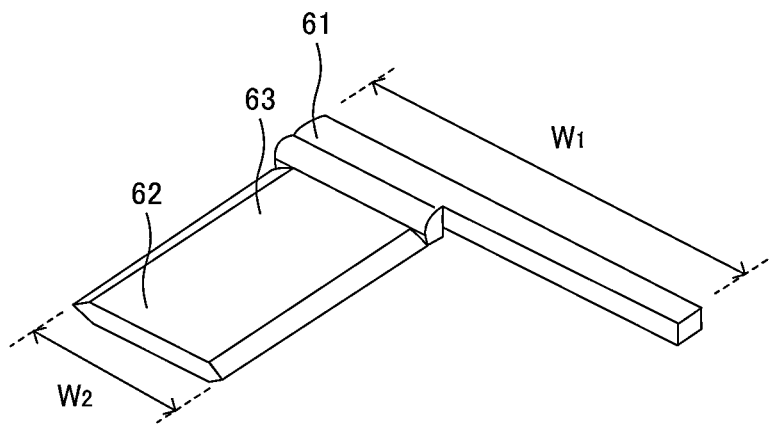
FIG. 4 is a schematic perspective view illustrating an example of an electrode terminal in the present disclosure.

The plan-view shape of the electrode terminal is not particularly limited, and examples thereof may include an L-shape. As shown in FIG. 2B, when cathode terminal 110 and anode terminal 120 are of the L-shape, both of them may be easily placed on the identical side of the electrode body, by placing the two in positional relationship of an inversion. Therefore, the battery structure may be simplified so that the volume energy density may be easily improved. Also, in the electrode terminal, the inner current collecting portion and the outer current collecting portion may be one member, and may be different members. For example, in electrode terminal 60 shown in FIG. 3A, inner current collecting portion 61 and outer current collecting portion 62 are one member. Meanwhile, in electrode terminal 60 shown in FIG. 4, inner current collecting portion 61 and outer current collecting portion 62 are different members. Incidentally, in electrode terminal 60 shown in FIG. 4, outer current collecting portion 62 and intermediate portion 63 are one member. Also, in the present disclosure, at least one of the cathode terminal and the anode terminal may be the electrode terminal wherein the width of the inner current collecting portion is larger than the width of the outer current collecting portion.

The battery in the present disclosure comprises an electrode body, and an exterior body including an inner region configured to house the electrode body. Also, the battery in the present disclosure may include only one electrode body, and may include a plurality of electrode bodies.

For example, as shown in FIG. 1 and FIGS. 2A and 2B, as the electrode body, battery 100 may include first electrode body 10 and second electrode body 20. The first electrode body includes electrode tab P, and electrode tab Q having the opposite polarity to electrode tab P. In FIG. 1, for example, electrode tab P is an anode tab, and electrode tab Q is a cathode tab. Meanwhile, the second electrode body includes electrode tab R having the opposite polarity to electrode tab P, and electrode tab S having the opposite polarity to electrode tab R. In FIGS. 2A and 2B, for example, electrode tab R is a cathode tab, and electrode tab S is an anode tab. Also, although not shown in the figures, when electrode tab P is a cathode tab, electrode tab Q is an anode tab, electrode tab R is an anode tab, and electrode tab S is a cathode tab.

As shown in FIG. 1, electrode tab P and electrode tab R may be connected in inner region I. "Connection" in the present disclosure means at least an electrical connection, and may or may not mean a physical connection (direct contact), within the range not technically contradicting. As shown in FIG. 1 and FIGS. 2A and 2B, electrode tab P and electrode tab R are placed on the identical side of the electrode body, and respectively in contact with connecting member 40. Thereby, first electrode body 10 and second electrode body 20 are connected in series. Meanwhile, although not shown in the figures, electrode tab P and electrode tab R may be directly connected, not via the connecting member.

Also, as shown in FIGS. 2A and 2B, first electrode body 10 and second electrode body 20 may be stacked along thickness direction $D_T$ via insulating member 30. Here, the following case is assumed: a first current collector placed on the most second electrode body 20 side in first electrode body 10, and a second current collector placed on the most first electrode body 10 side in second electrode body 20 have opposite polarities. For example, the following case is assumed: the first current collector is a cathode current collector, and the second current collector is an anode current collector. In this case, in order to connect first electrode body 10 and second electrode body 20 in series, the first current collector and the second current collector may be simply contacted with each other, and the need to provide insulating member 30 is low.

Figure 7:
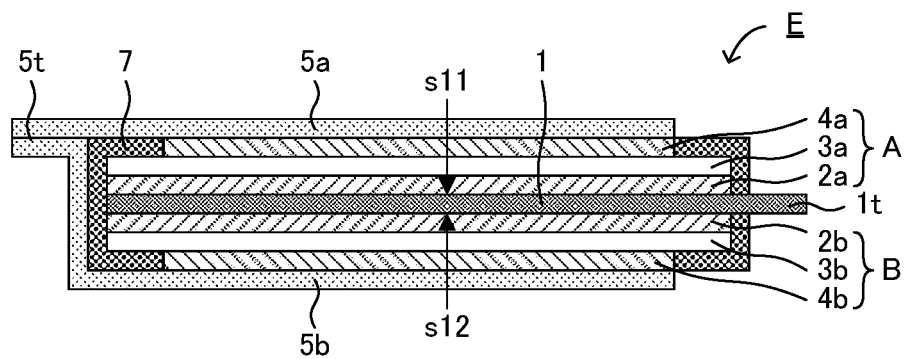
FIG. 7 is a schematic cross-sectional view illustrating an example of an electrode body in the present disclosure.

Meanwhile, a case wherein the first current collector and the second current collector have the same polarity is assumed. In this case, in order to connect first electrode body 10 and second electrode body 20 in series, it is preferable to place insulating member 30 between first electrode body 10 and second electrode body 20 and connect electrode tab P and electrode tab R, as shown in FIGS. 2A and 2B. In particular, when both the first electrode body and the second electrode body have a structure as shown in FIG. 7, that is, a structure including current collector having the same polarity on both sides, it is preferable to place the insulating member between the first electrode body and the second electrode body since the opposing first current collector and second current collector have the same polarity.

Figure 5:
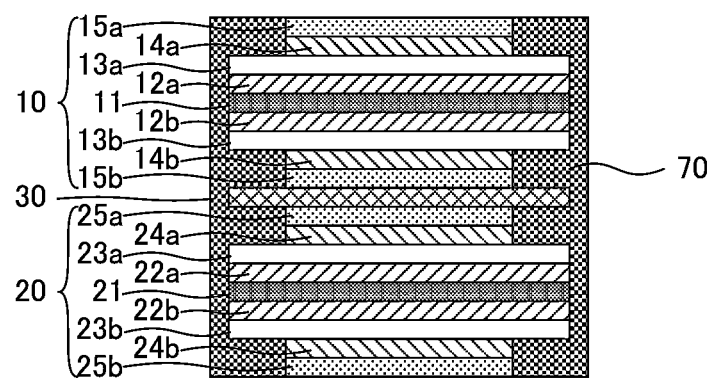
FIG. 5 is a schematic cross-sectional view illustrating an example of a battery in the present disclosure.

Also, FIG. 5 is a schematic cross-sectional view illustrating an example of a battery in the present disclosure, and corresponds to the cross-sectional view taken along the line A-A in FIG. 1. In FIG. 5, first electrode body 10 includes anode current collector 11; first anode layer 12a, first separator layer 13a, first cathode layer 14a, and first cathode current collector 15a placed in this order from one surface of anode current collector 11; and second anode layer 12b, second separator layer 13b, second cathode layer 14b, and second cathode current collector 15b placed in this order from another surface of anode current collector 11. Meanwhile, second electrode body 20 includes anode current collector 21; first anode layer 22a, first separator layer 23a, first cathode layer 24a, and first cathode current collector 25a placed in this order from one surface of anode current collector 21; and second anode layer 22b, second separator layer 23b, second cathode layer 24b, and second cathode current collector 25b placed in this order from another surface of anode current collector 21. Also, insulating member 30 is placed between second cathode current collector 15b in first electrode body 10 and first cathode current collector 25a in second electrode body 20. Also, as shown in FIG. 5, the electrode body (first electrode body 10, second electrode body 20) may include insulating protective layer 70 on the side surface. By providing insulating protective layer 70 on the side surface, the short circuit may be suppressed, or it is possible to suppress the positional deviation of each member constituting the electrode body. Examples of the material of the insulating protective layer may include a resin, and specific examples of the resin may include a urethane acrylate resin, an epoxy resin, and an olefin resin. Also, the resin may be a thermoplastic resin, and may be a cured resin (such as a cured product of a thermosetting resin or an ultraviolet curable resin).

Examples of the material of the insulating member may include a resin, and specific examples of the resin may include polyolefin resins such as polypropylene (PP) and polyethylene (PE); a polyimide resin; and a polyphenylene sulfide resin (PPS). The insulating member is preferably larger than the first current collector (current collector placed on the most second electrode body 20 side in first electrode body 10) and the second current collector (current collector placed on the most first electrode body 10 side in second electrode body 20) in plan view. That is, it is preferable that the insulating member includes the first current collector and the second current collector in plan view. The reason therefor is to effectively insulate the first current collector and second current collector. Further, it is preferable that the insulating member is larger than the largest current collector in the first electrode body (for example, anode current collector 11 in FIG. 5) and the largest current collector in the second electrode body (for example, anode current collector 21 in FIG. 5) in plan view. This is because, for example, the short circuit is less likely to occur, when the battery is pressurized (confined) from the outside.

Also, as shown in FIG. 1, cathode terminal 110 and anode terminal 120 may be placed on the identical side of the electrode body. In such case, the battery structure may be simplified, and the volume energy density may be easily improved. Also, when cathode terminal 110 and anode terminal 120 are placed on the identical side of the electrode body, it is preferable that cathode terminal 110 and anode terminal 120 are placed so as not to overlap with each other in plan view. The reason therefor is to suppress the short circuit. The cathode terminal and the anode terminal may be placed on different sides opposing to each other, of the electrode body.

When the number of electrode bodies included in the battery in the present disclosure is regarded as "N", the number of "N" may be 1, may be 2, and may be 3 or more. Meanwhile, the number of "N" is, for example, 100 or less. When the battery in the present disclosure includes the first electrode body to the N-th electrode body (2≤N), electrode tab $T_{N-1}$ in the (N−1)th electrode body and electrode tab $T_N$ in the Nth electrode body may be connected to each other in the inner region of the exterior body. Incidentally, electrode tab $T_{N-1}$ and the electrode tab $T_N$ have the opposite polarity to each other. Also, the first electrode body to the Nth electrode body are preferably same member. Also, the battery in the present disclosure may include a plurality of insulating members, and the insulating members may be placed between adjacent electrode bodies, respectively.

2. Configuration of Electrode Body

Figure 6A:
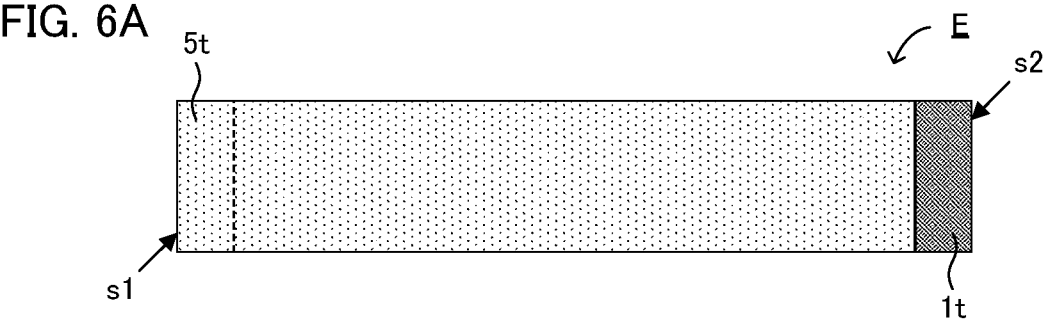
FIGS. 6A and 6B are a schematic plan view and a schematic cross-sectional view illustrating an example of an electrode body in the present disclosure.
Figure 6B:
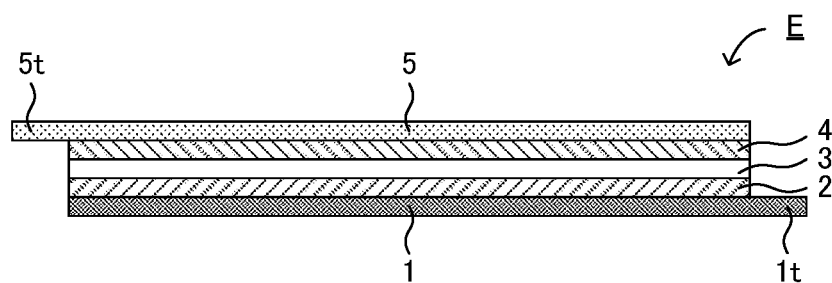

FIG. 6A is a schematic plan view illustrating an electrode body in the present disclosure, and FIG. 6B is a side view of FIG. 6A. Electrode body E shown in FIGS. 6A and 6B includes: cathode layer 4; anode layer 2; separator layer 3 placed between cathode layer 4 and anode layer 2; cathode current collector 5 configured to collect current of cathode layer 4; and anode current collector 1 configured to collect current of anode layer 2. Cathode current collector 5 includes cathode tab 5t at a position that does not overlap with cathode layer 4, in plan view. Similarly, anode current collector 1 includes anode tab 1t at a position that does not overlap with anode layer 2, in plan view. Cathode current collector 5 and cathode tab 5t may be one member, and may be different members, as long as they are electrically connected to each other. This also applies to anode current collector 1 and anode tab 1t.

Also, in plan view, as shown in FIG. 6A, cathode tab 5t and anode tab 1t may be respectively placed on different sides (side s1, side s2) opposing to each other (both-side tab structure). Meanwhile, although not shown in the figures, the cathode tab and the anode tab may be respectively placed on the identical side (one-side tab structure). Also the plan-view shape of the electrode body (plan-view shape excluding cathode tab and anode tab) is, for example, a rectangular shape. As shown in FIG. 6A, the plan-view shape of electrode body E excluding cathode tab 5t and anode tab 1t is a rectangular shape. Cathode tab 5t and anode tab 1t are place to oppose to each other in the longitudinal direction of electrode body E.

The electrode body in the present disclosure may include one power generation element including a cathode layer, a separator layer, and an anode layer, may include two of them, and may include three or more of them. When the electrode body includes a plurality of power generation elements, they may be connected in parallel and may be connected in series.

FIG. 7 is a schematic cross-sectional view illustrating an example of an electrode body in the present disclosure, and is a schematic cross-sectional view illustrating a condition wherein a plurality of power generation elements are connected in parallel. Electrode body E shown in FIG. 7 includes: anode current collector 1; first anode layer 2a, first separator layer 3a, first cathode layer 4a, and first cathode current collector 5a placed in this order from one surface s11 of anode current collector 1; and second anode layer 2b, second separator layer 3b, second cathode layer 4b, and second cathode current collector 5b placed in this order from another surface s12 of anode current collector 1. First cathode current collector 5a and second cathode current collector 5b are connected to each other, and constitute cathode tab 5t. Also, insulating protective layer 7 is placed between second cathode current collector 5b and side surface portion of anode (anode current collector 1, first anode layer 2a, and second anode layer 2b) in order to prevent a short circuit.

Electrode body E shown in FIG. 7 is useful as, for example, an electrode body used in an all solid state battery including an inorganic solid electrolyte such as oxide solid electrolyte, and sulfide solid electrolyte. In an all solid state battery including the inorganic solid electrolyte, the electrode body must be pressed at very high pressures in order to form good ion conducting paths. In this case, since the configuration of the other layers is symmetrical with respect to anode current collector 1, electrode body E shown in FIG. 7 is advantageous in that a stress due to the difference in the stretching ability of the cathode layer and the anode layer is not likely to be generated. Specifically, in electrode body E shown in FIG. 7, first anode layer 2a, first separator layer 3a, first cathode layer 4a, and first cathode current collector 5a are placed in this order on one surface s11 with respect to anode current collector 1, and second anode layer 2b, second separator layer 3b, second cathode layer 4b, and second cathode current collector 5b are placed in this order on another surface s12. Since the configuration of the other layers is symmetrical with respect to anode current collector 1 as described above, a stress due to the difference in the stretching ability of the cathode layer and the anode layer is not likely to be generated. As the result, the breakage of the anode current collector and cracking of the cathode layer and the anode layer may be suppressed. Also, in the present disclosure, a plurality of electrode bodies E shown in FIG. 7 may be used, and these may be stacked in the thickness direction to form one electrode body E'. At this time, the opposing cathode current collector (first cathode current collector 5a in one electrode body E and second cathode current collector 5b in another electrode body E) may be different member with each other, and may be one member (one cathode current collector may be shared).

Also, electrode body E shown in FIG. 7 includes two cathode current collectors per one anode current collector. Meanwhile, the electrode body in the present disclosure may include two anode current collectors per one cathode current collector. That is, the electrode body in the present disclosure may include a cathode current collector; a first cathode layer, a first separator layer, a first anode layer and a first anode current collector, placed in this order from one surface of the cathode current collector; and a second cathode layer, a second separator layer, a second anode layer and a second anode current collector, placed in this order from another surface of the cathode current collector. In this case, the first anode current collector and the second anode current collector may be connected to constitute an anode tab.

Figure 8:
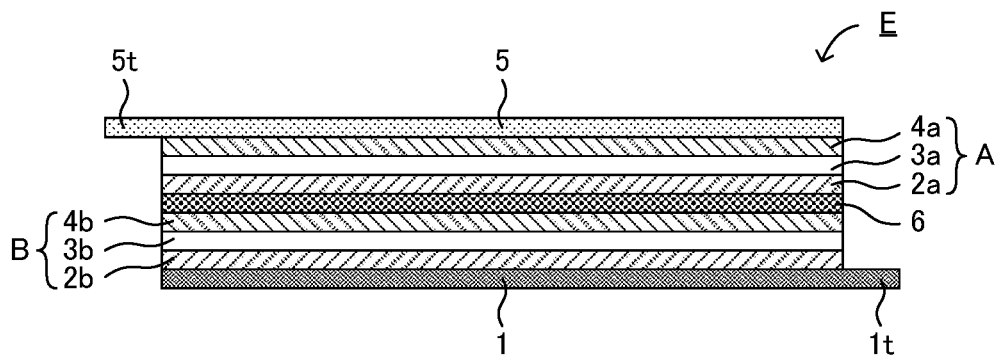
FIG. 8 is a schematic cross-sectional view illustrating an example of an electrode body in the present disclosure.
Figure 9:
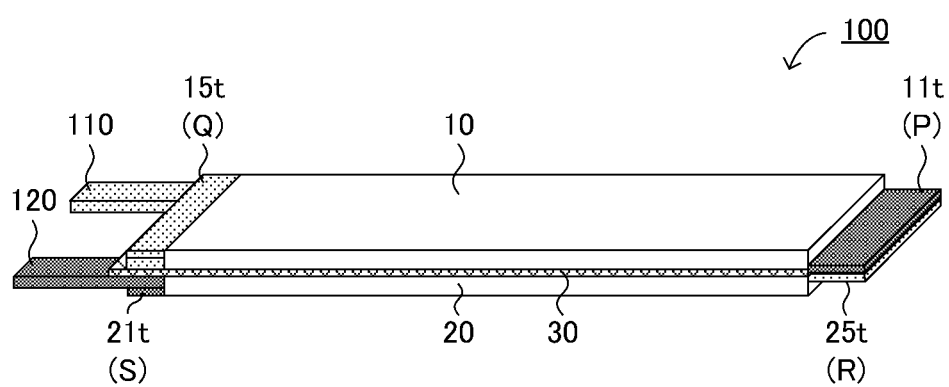
FIG. 9 is a schematic perspective view identical to FIG. 2A but omits connecting member 40.

FIG. 8 is a schematic cross-sectional view illustrating an electrode body in the present disclosure, and is a schematic cross-sectional view illustrating a condition wherein a plurality of power generation elements are connected in series. Electrode body E shown in FIG. 8 includes power generation element A including first cathode layer 4a, first separator layer 3a, and first anode layer 2a, and power generation element B including second cathode layer 4b, second separator layer 3b, and second anode layer 2b. First cathode layer 4a in power generation element A is connected to cathode current collector 5, and second anode layer 2b in power generation element B is connected to anode current collector 1. Also, first anode layer 2a in power generation element A and second cathode layer 4b in power generation element B are electrically connected via intermediate current collector 6.

The cathode layer includes at least a cathode active material. Further, the cathode layer may include at least one of a conductive material, an electrolyte, and a binder. Examples of the cathode active material may include an oxide active material. Examples of the oxide active material may include rock salt bed type active materials such as $LiNi_{1/3}Co_{1/3}Mn_{1/3}O_2$; spinel type active materials such as $LiMn_2O_4$; and olivine type active materials such as $LiFePO_4$. Also, sulfur (S) may be used as the cathode active material. Examples of the shape of the cathode active material may include a granular shape. Examples of the conductive material may include a carbon material. The electrolyte may be a liquid electrolyte, and may be a solid electrolyte. The liquid electrolyte (electrolyte solution) includes, for example, supporting salts such as $LiPF_6$ and a solvent such as a carbonate-based solvent. The solid electrolyte may be an organic solid electrolyte such as a gel electrolyte, and may be an inorganic solid electrolyte such as an oxide solid electrolyte and a sulfide solid electrolyte. Also, examples of the binder may include a rubber-based binder and a fluoride-based binder.

The anode layer includes at least an anode active material. Further, the anode layer may include at least one of a conductive material, an electrolyte, and a binder. Examples of the anode active material may include a metallic active material such as Li and Si; a carbon active material such as graphite; and an oxide active material such as $Li_4Ti_5O_{12}$. Examples of the shape of the anode active material may include a granular shape and a foil shape. The conductive material, the electrolyte, and the binder are the same as those described above. The separator layer includes at least an electrolyte. The electrolyte may be a liquid electrolyte and may be a solid electrolyte. Also, examples of the material of the cathode current collector may include aluminum, SUS, nickel, and carbon. Examples of the material of the anode current collector may include copper, SUS, nickel, and carbon. The shapes of the cathode current collector and the anode current collector are, for example, a foil shape.

3. Battery

The battery in the present disclosure includes an exterior body including an inner region configured to house the electrode body. The exterior body may or may not have flexibility. Examples of the former may include an aluminum laminate film, and examples of the latter may include a case made of SUS. Also, when the exterior body is a laminated film, a sealing region wherein the inner resin layers of the laminated film are melted, may be included between the inner region and the outer region of the exterior body.

Also, the kind of the battery in the present disclosure is not particularly limited; and is typically a lithium ion secondary battery. Further, the use of the battery in the present disclosure is not particularly limited, and examples thereof may include a power supply of a vehicle such as a hybrid electric vehicle, a battery electric vehicle, a gasoline-powered vehicle, and a diesel-powered vehicle. In particular, it is preferably used in the driving power supply of a hybrid electric vehicle, or a battery electric vehicle. Also, the battery in the present disclosure may be used as a power source for moving objects other than vehicles, such as railroad vehicles, ships, and airplanes, or may be used as a power source for electric appliances such as information processing apparatuses.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

REFERENCE SIGNS LIST

1 . . . anode current collector
1t . . . anode tab
2 . . . anode layer
3 . . . separator layer
4 . . . cathode layer
5 . . . cathode current collector
5t . . . cathode tab
10 . . . first electrode body
20 . . . second electrode body
30 . . . insulating member
40 . . . connecting member
50 . . . exterior body
60 . . . electrode terminal
61 . . . inner current collecting portion
62 . . . outer current collecting portion
63 . . . intermediate portion
70 . . . insulating protective layer
100 . . . battery

What is claimed is:

1. A battery comprising an electrode body having sides, and an exterior body including an inner region configured to house the electrode body, and the battery includes an electrode terminal for a cathode and an electrode terminal for an anode, each placed so as to extend from the inner region to an outer region of the exterior body, each electrode terminal includes an inner current collecting portion placed in the inner region and connected to an electrode tab of the electrode body, and an outer current collecting portion placed in the outer region, and the battery includes at least a first electrode body and a second electrode body as a plurality of the electrode bodies, the first electrode body includes an electrode tab P, the second electrode body includes an electrode tab R having an opposite polarity to the electrode tab P, the electrode tab P and the electrode tab R are connected in the inner region, the inner current collecting portions of the cathode terminal and the anode terminal are respectively placed on the identical side of the electrode body, each electrode terminal includes an intermediate portion between the inner current collecting portion and the outer current collecting portion, and the intermediate portion is placed in a sealing region of the exterior body, and $1.2 \leq W1/W2 \leq 5.0$ $1 < W1/W3 \leq 5$ $1.2 \leq W1/W4 \leq 5.0$, wherein W1 is the width of the inner current collecting portion, W2 is the width of the outer current collecting portion, W3 is the width of the electrode tab connected to the inner current collecting portion, and W4 is the width of the intermediate portion, wherein the exterior body is a laminated film, wherein an insulating protective layer is provided on at least two side surfaces of each electrode body in the inner region, wherein the width of a cathode layer between each side surface is smaller than the width of an anode layer between each side surface, and the insulating protective layer is wider at portions contacting each cathode layer than portions contacting each anode layer.

2. The battery according to claim 1, wherein W3 is larger than W2.

3. The battery according to claim 1, wherein a plan-view shape of the electrode terminal is an L-shape.

4. The battery according to claim 1, wherein the first electrode body and the second electrode body are stacked along a thickness direction via an insulating member, and the first electrode body and the second electrode body respectively include:
   an anode current collector,
   a first anode layer, a first separator layer, a first cathode layer, and a first cathode current collector, placed in this order from one surface of the anode current collector, and
   second anode layer, a second separator layer, a second cathode layer, and a second cathode current collector, placed in this order from another surface of the anode current collector.

5. The battery according to claim 1, wherein the electrode tabs P and R are physically connected.

6. The battery according to claim 1, wherein the electrode tabs P and R are connected via a connecting member.

7. The battery according to claim 1, wherein both surfaces of the intermediate portion are respectively fused to the exterior body.

* * * * *